Aug. 5, 1969    F. SCHILDE ET AL    3,459,238
GRIPPING SHUTTLE LOOM
Original Filed Sept. 16, 1965    15 Sheets-Sheet 8

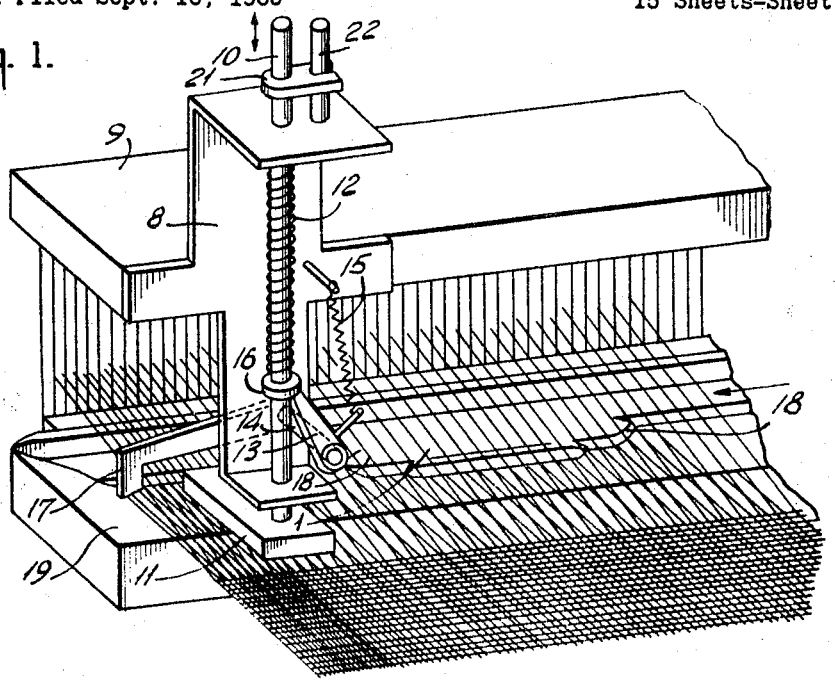
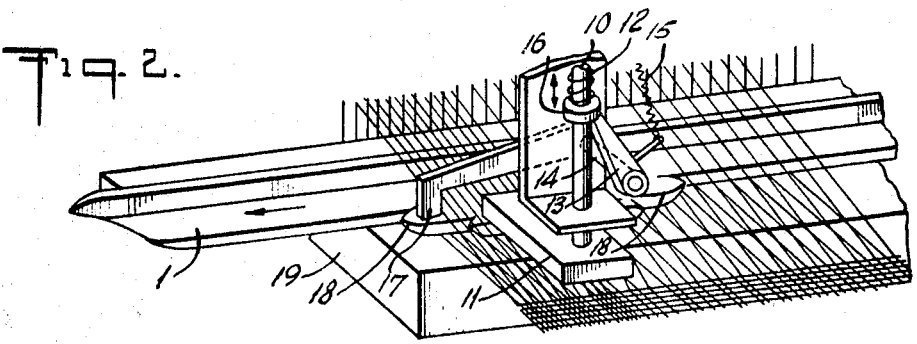
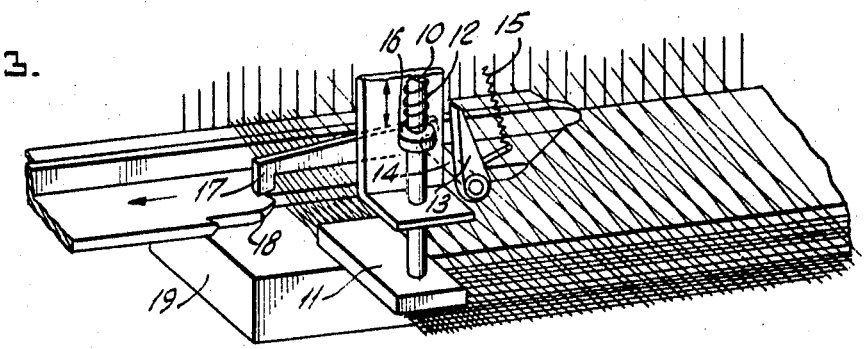

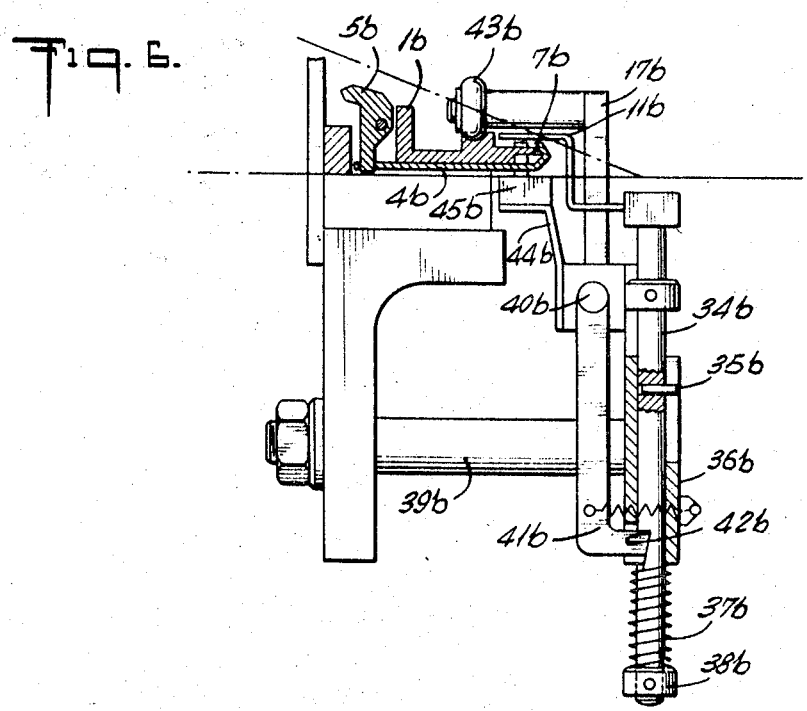
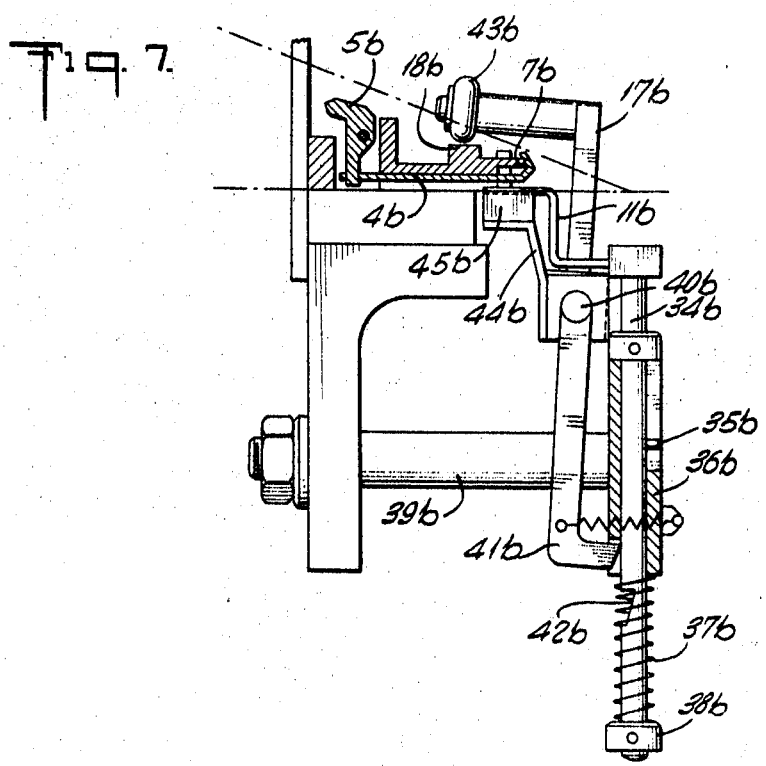

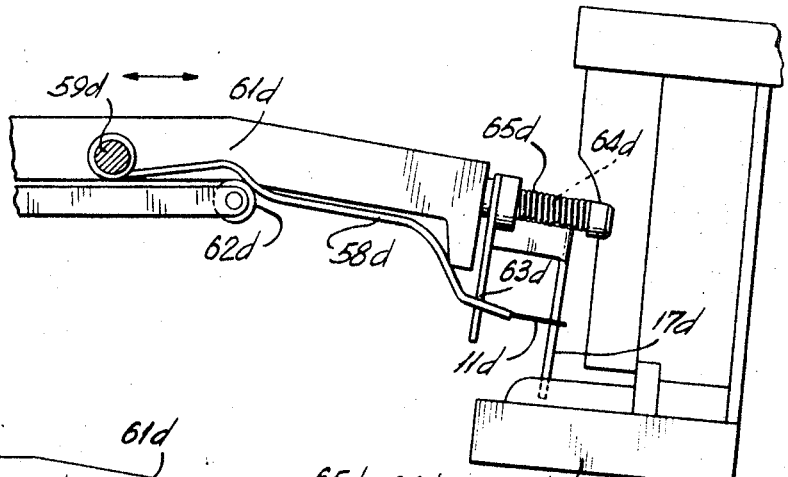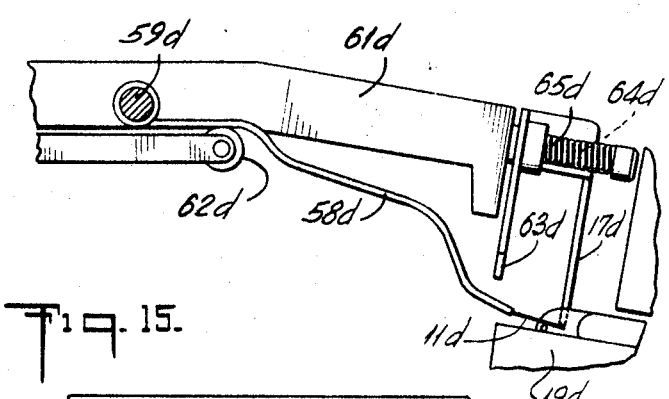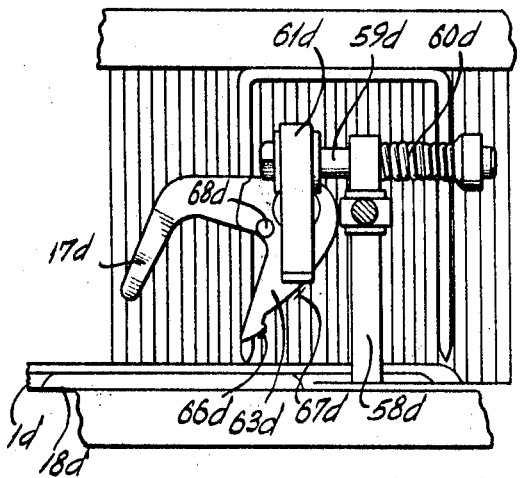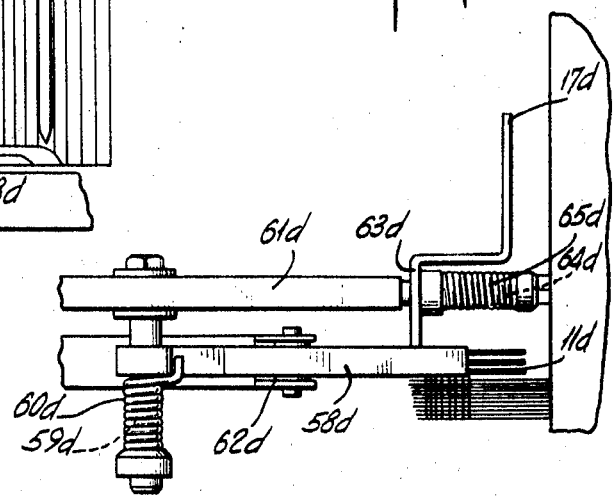

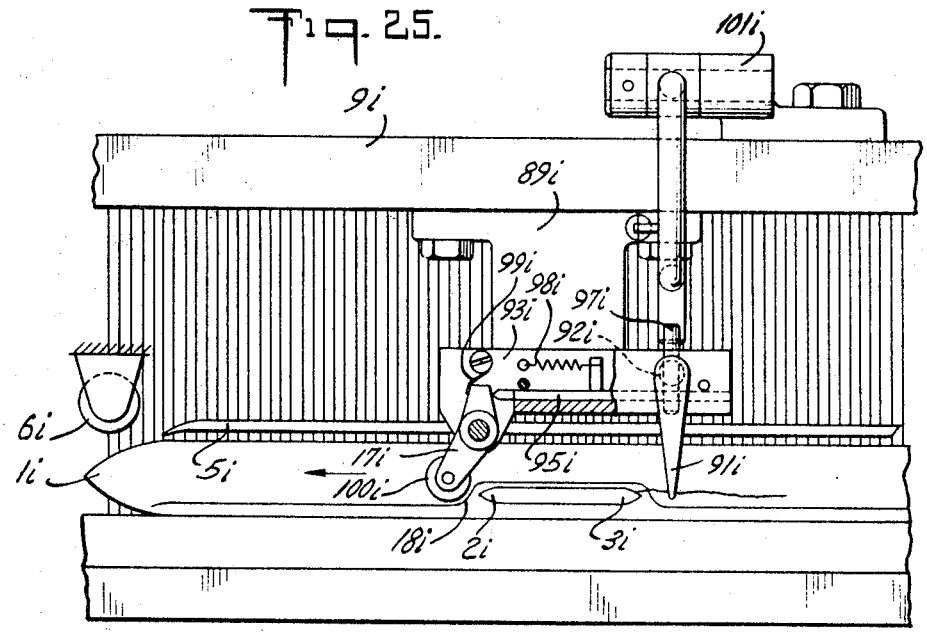
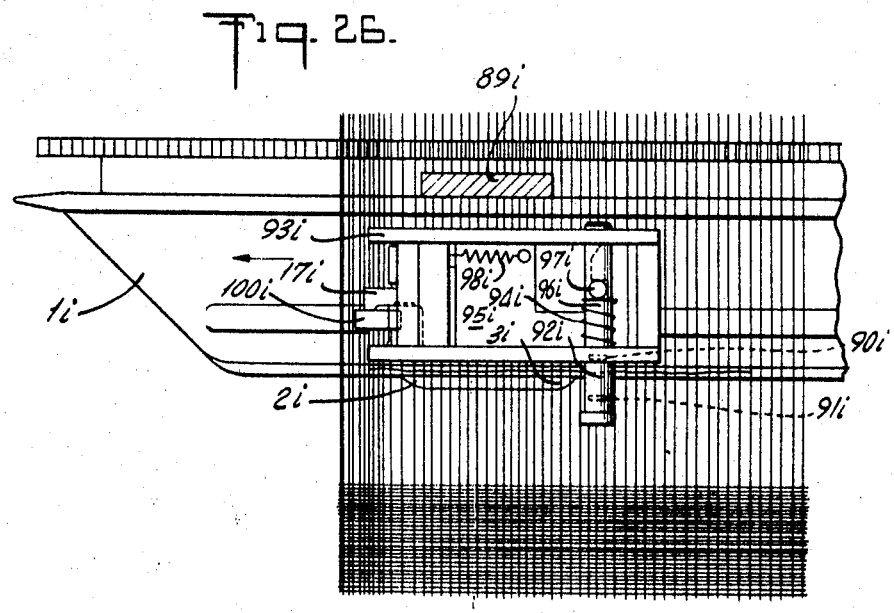

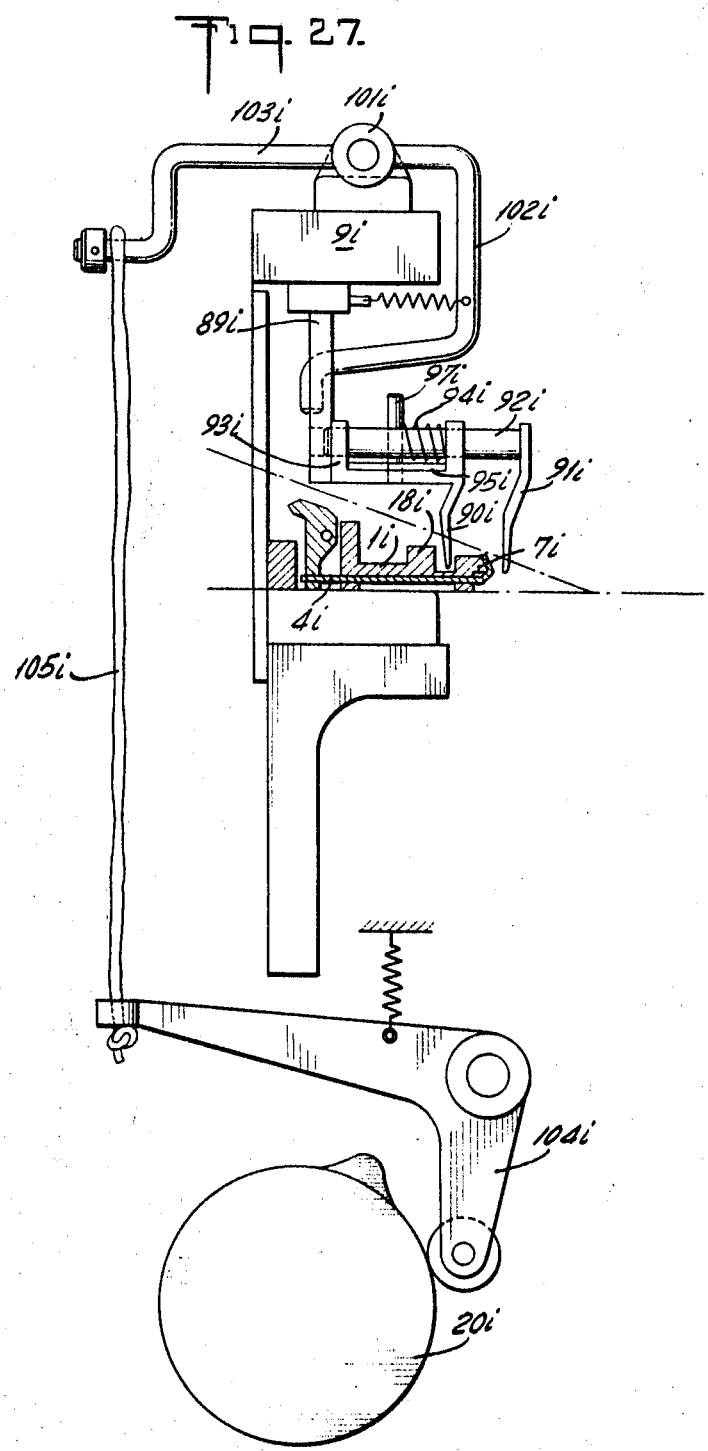

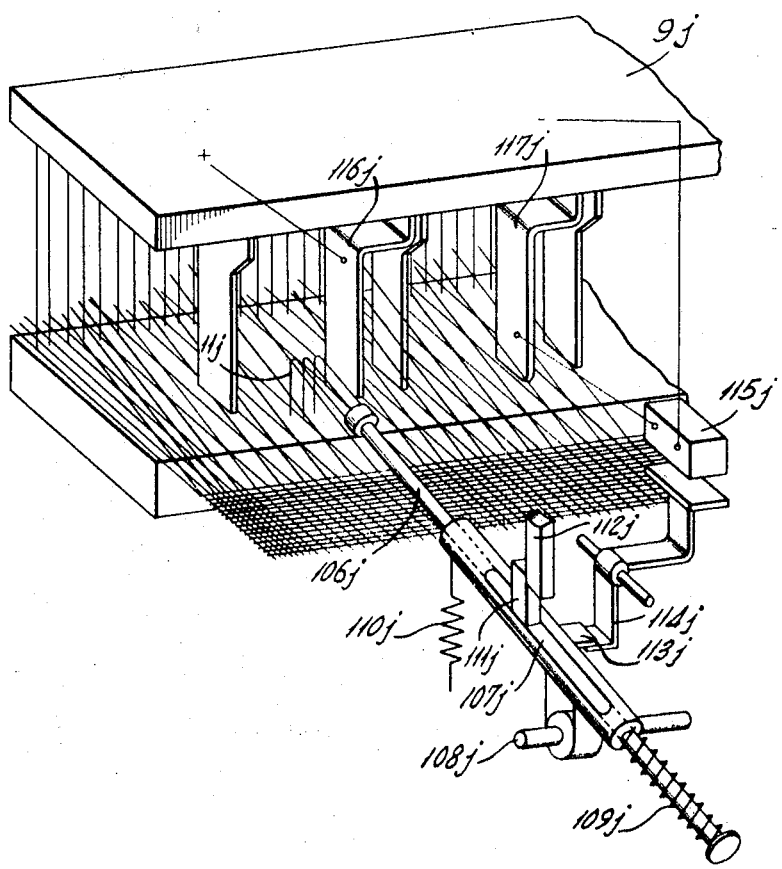

United States Patent Office 3,459,238
Patented Aug. 5, 1969

3,459,238
GRIPPING SHUTTLE LOOM
Fritz Schilde, Manfred Richter, and Dietrich Ambrosius, Grossenhain, Saxonia, Manfred Tille, Oederan, Saxonia, Ludwig Gunther, Gunter Loos, Heinrich Mzyk, and Siegfried Miersch, Karl-Marx-Stadt, Winfried Haupt, Grossenhain, Saxonia, Wolfgang Rossel, Zabeltitz, Gunter Beuchel and Gerhard Erler, Grossenhain, Saxonia, and Herbert Weder, Neugersdorf, Saxonia, Germany, assignors to VEB Webstuhlbau Grossenhain, Grossenhain, Saxonia, Germany
Continuation of application Ser. No. 487,659, Sept. 16, 1965. This application Dec. 26, 1967, Ser. No. 693,682
Int. Cl. D03d 47/18
U.S. Cl. 139—122                                        9 Claims

ABSTRACT OF THE DISCLOSURE

A gripping shuttle loom with a shed, a slay, a driven member and a shuttle track is disclosed, which comprises a gripping shuttle movable along the shuttle track and carrying a first weft retaining device while a second weft retaining device is mounted on the slay. The second weft retaining device is movable into a weft retaining position by means on the shuttle and into a weft releasing position by the driven member. The second weft retaining device includes a presser, a rod supporting the presser and movable in longitudinal direction of the rod, a spring urging the presser into engagement with the slay to retain the weft therebetween, and a locking member normally holding the presser out of engagement with the slay. The means on the shuttle are provided with a member for releasing the locking member to thereby permit the spring to bring the presser into weft retaining engagement with the slay. The second weft retaining device is located outside the shed and includes also a table adapted to be raised, and lowered by the presser.

---

This application is a continuation of application Ser. No. 487,659, filed Sept. 16, 1965, and now abandoned.

This invention relates to a gripping shuttle loom with a retaining device provided on the gripping shuttle to retain the beginning of the weft when the weft is being inserted into the shed, and a second retaining device which does not move in the direction of the weft and which engages the weft until the weft is bound into the shed. The second retaining device is released by means of a driven member.

Under the present construction of gripping, shuttle looms both the release and the subsequent disengagement of a second retaining device is effected by adjusting means which are in positive operative connection with the machine drive. This construction produces an uncertainty in the operation of the second retaining device and there is no proper coordination between the movement of the gripping shuttle and the operation of the second retaining device. If, for example, the gripping shuttle is delayed, the second retaining device may have already been released so that it will no longer engage the beginning of the weft. If, on the other hand, the gripping shuttle arrives too early, the second retaining device will not be ready to engage the beginning of the weft. In either case, it is conceivable that the retaining device of the gripping shuttle will release the beginning of the weft without the weft first being engaged by the second retaining device.

These disadvantages of known gripping shuttle looms are eliminated by this invention in that the release of a second retaining device is made to correspond with the arrival of the gripping shuttle so that a proper sequence of operation between the gripping shuttle and the second retaining device is assured.

This object is achieved, according to the invention, in that the gripping shuttle operates as the release member for the second retaining device. In this manner, a satisfactory transfer of the beginning of the weft from the retaining device of the gripping shuttle to the second retaining device is insured at each weft insertion. This transfer is very important in gripping shuttle looms.

It is another object of the invention to provide a loom in which the gripping shuttle merely represents the release member for the second retaining device, and that the second retaining device is associated with an adjusting member whose movement depends on the machine drive, to place the second retaining device in the inoperative position after it has been released. In contrast to the time of the arrival of the shuttle, the time of the blow of the slay and the time of the change of the shed are constant. It is, therefore, advisable to make the release of the beginning of the weft by the second retaining device independent of the arrival of the shuttle.

It is, therefore, a further object of this invention to provide for the release of the beginning of the weft by the second retaining device to be independent of the shuttle arrival.

The second retaining device can be a mechanical or pneumatic device. Several embodiments of this second retaining device will be described in the specification below.

A more complete understanding of this invention and of the several embodiments which represent the invention will be had by reference to the drawings attached hereto studied in conjunction with the following complete specification and appended claims.

In the drawings:
FIG. 1 is a detailed portion of a gripping shuttle loom showing the second retaining device arranged above the shed on the slay with a presser moving up and down and acting on the upper shed on the beginning of the weft.

FIG. 2 is a greater detail of FIG. 1 showing the shuttle and presser arrangement.

FIG. 3 is another detail of FIG. 1 further illustrating the operation of the shuttle and the presser.

FIGS. 6 to 9 show an embodiment of this invention in which a second retaining device is arranged on the slay but below the shed, with a presser consisting of a reed.

FIGS. 13 to 16 show another embodiment of this invention in which the second retaining device is arranged for movement on the machine frame above the shed.

FIGS. 25 through 27 show an embodiment of this invention in which the second retaining device consists of a shed clamp arranged on the slay.

FIG. 28 shows an electromagnetically released second retaining device with a reed-shaped presser.

Figure 4:
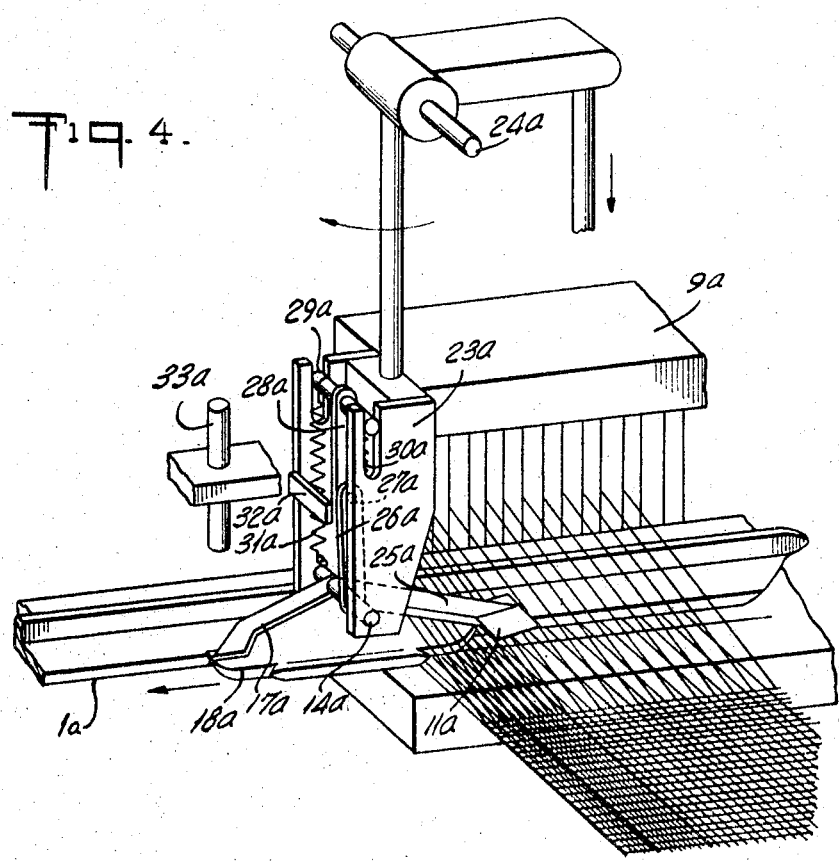
FIG. 4 shows a second embodiment of this invention showing a second retaining device with a pivotal presser.

In general a gripping shuttle loom uses a gripping shuttle for the insertion of a single weft from both sides. The specific structure of the gripping shuttle is only of secondary importance to the present invention. Thus, the gripping shuttle proper may have any desired structure, as for instance that disclosed in U.S. Patent No. 2,168,420. In reference to FIGS. 6 through 9, the gripping shuttle is provided with two catches 2b and 3b, which are fixedly mounted on a slide 4b arranged to the catches for movement in a right angle to the longitudinal axis of the gripping shuttle. The slide 4b is held in operating position by means of a spring (not shown) and is connected with a flap 5b extending in the longitudinal direction of the gripping shuttle and controlled by means of stationary rollers 6b. By pressing down flap 5b, slide 4b can be advanced. Slide 4b forms, at the same time, the moving part of clamp 7b in which the moving beginning of the weft is inserted, so that by advancing slide 4b, the inserted weft is released by the gripping shuttle 1b. Clamp 7b is the first retaining device for the beginning of the weft when the weft is inserted into the shed. The second retaining device which has the function of retaining the beginning of the weft until the weft is bound into the shed does not move in the weft direction, and consists of gripping shuttles with bi-lateral weft insertion, of two alternately operating individual elements. For the sake of simplicity, only one of these two individual elements is shown in the drawings. According to FIGS. 1 through 3, the left retaining element device has a guide housing 8 fixedly mounted on a cover plate 9 of the reed and is thus in pivotal connection with the slay. A vertical rod 10 is axially movable in the guide housing 8, the lower end of which comprises a presser 11. The rod 10 and the presser 11 are urged into their operative or effective weft retaining position of FIG. 3 by a compression spring 12 and may be held in the inoperative position of FIGS. 1 and 2 by means of a locking lever 13. The locking lever 13 is pivotally connected with a journal bearing pin 14 mounted in a bearing of the guide housing 8. A tension spring 15 hold the locking lever 13 in the operative or locking position of FIGS. 1 and 2 in which it engages the lower portion of a conical collar 16 associated with the rod 10. An adjusting lever 17 is rigidly mounted on the bearing pin 14 and moves into its inoperative or ineffective position when the locking lever 13 is in its operative position shown in FIG. 1. The retaining device is released by the gripping shuttle 1 which is provided at both sides with an adjusting member which is in the form of an inclined contact surface or cam 18.

When the gripping shuttle 1, associated with its left adjusting member 18, engages the lower portion of the adjusting lever 17, the adjusting lever 17 moves upwardly, whereby the trunnion 14 is moved in a clockwise direction (see FIG. 2), thus moving the locking lever 13 toward its inoperative position of FIG. 3. The compression spring 12 through collar 16 now moves the presser 11 into its operative position shown in FIG. 3. Since the retaining device is arranged above the shed the warps of the upper shed, are pressed down so that the beginning of the inserted weft is jammed after it has been released by the clamp 7 of the gripping shuttle 1. The abutment of the presser 11 is a fixed surface of the slay, for example, the shuttle track 19 of the slay, against which the respective warps of the upper and lower shed are then pressed with the beginning of the weft in between as shown in FIG. 3.

Figure 8:
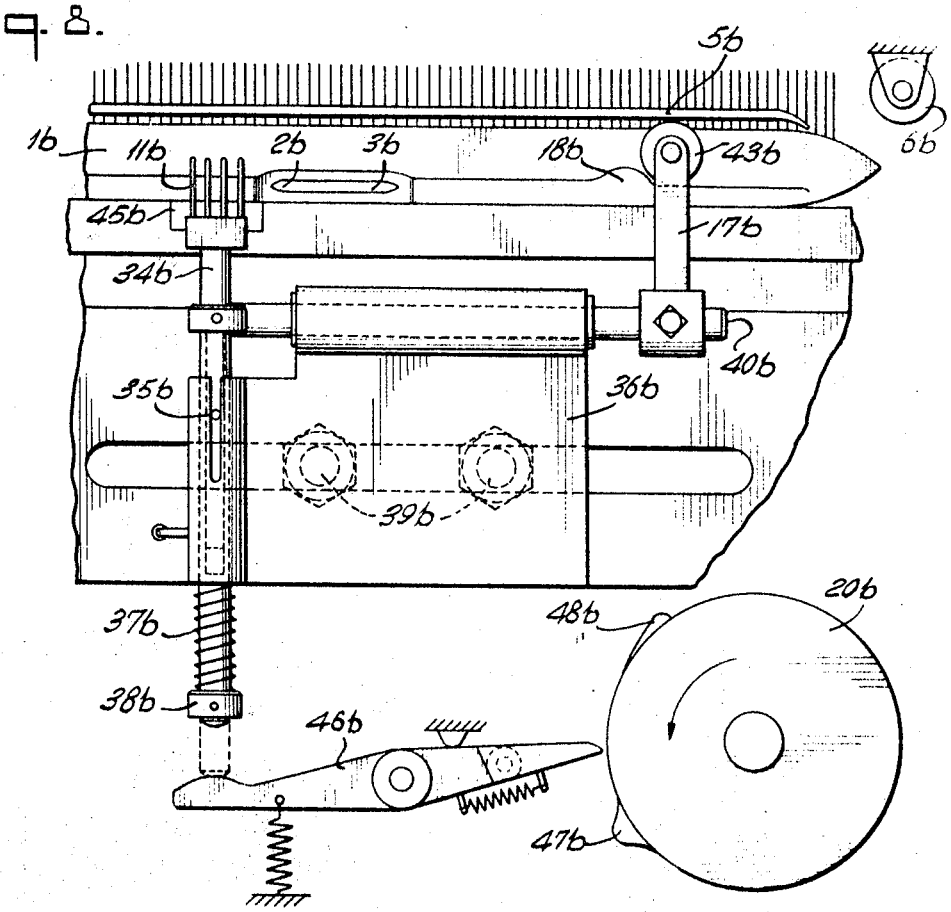

In order to enable the weft to be beaten up or bound into the shed, presser 11 is temporarily lifted by means of a cam disk 20 with a cam 48b, similar to the one shown in FIG. 8 and described further below.

After the weft has been bound into the shed and before the gripping shuttle returns, presser 11 must be returned to its inoperative position (FIG. 1). This is effected by an adjusting member whose movement depends on the machine drive and which consists, for example, of a cam disc 20 (as shown in FIGS. 8 and 27). Cam disc 20 can operate on a lever such as 104i in FIG. 27 on which a Bowden cable (not shown) can be mounted between the lever 104i and the rod 10 similar to the arrangement shown in FIG. 27. To prevent the presser 11 from rotating, a claw 21 is positioned at the upper end of rod 10 which is guided by a fixed pin 22 of guide housing 8.

Figure 5:
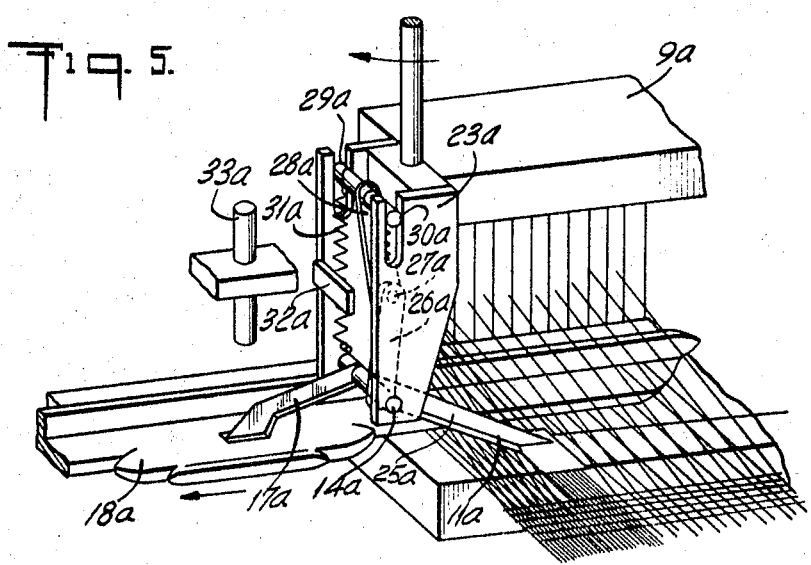
FIG. 5 is the embodiment of FIG. 4 illustrating the operation of the shuttle and presser and showing the shuttle in a different position along the weft.

In the embodiment shown in FIGS. 4 and 5, the second retaining device, which likewise consists of two individual devices, is also arranged above the shed having a guide housing 23a which can be pivoted in the weft direction about a stationary pin 24a connected to the slay. In the operating position, housing 23a is positioned at the left end of the slay cap 9a. Adjusting lever 17a and presser 11a are once again provided whereby in this embodiment, presser 11a is arranged at the free end of an arm 25a which forms a double lever together with adjusting lever 17a. This double lever is pivotally mounted on the guide housing 23a by means of bearing pin 14a in which an upwardly diverted lever 26a of a toggle joint is fixedly mounted. The upper end of lever 26a is connected by a bolt 27a to a second downwardly directed lever 28a of the toggle joint. A bearing pin 29a is positioned at the top of lever 28a and is placed in vertical guide grooves 30a which are formed in the walls of guide housing 23a. The toggle joint formed from levers 26a and 28a and bolt 27a is biased in the direction of bearing pin 14a by means of a tension spring 31a. The toggle joint has two bending positions. In one of such bending positions, as shown in FIG. 4, the adjusting lever 17a is in its operating or lowered position while the presser 11a is in its inoperative or lowered position. In this bending position, the toggle joint is held by means of stop 32a which consists of a tongue extending from guide housing 23a. When the adjusting member 18a of the gripping shuttle 1a engages the lower portion of adjusting lever 17a, adjusting lever 17a is moved upwardly and the presser 11a is lowered into its operating position as seen in FIG. 5. When the toggle joint attains the extended position, presser 11a is immediately actuated by the action of tension spring 31a. The whole assembly is thus designed as a spring mechanism. In the operating position (FIG. 5) presser 11a acts exactly in the same manner as the presser of the embodiment in FIGS. 1 to 3. Also in this embodiment, the return movement of presser 11 is controlled by a cam disk 20 as shown in FIGS. 8 or 27. Presser 11 is temporarily lifted to permit the reed to beat up the weft.

A stationary vertically extending pin 33a (FIG. 5) moves the adjusting lever 17a into the operating position after the inserted weft has been bound into the shed and moves the presser 11a upwardly. The pin is moved downwardly by means of the cam disc 20i (FIG. 27) and engages the adjusting lever 17a. Pin 33a could also be formed as a rigid lug which would prevent a downward movement of the adjusting lever 17a, when the guide housing 23a is pivoted in the direction of the arrow in FIG. 5. In this configuration cam disc 20b is used to pivot the pin 24a. The pivotal arrangement of the guide housing 23a has the advantage in that the beginning of the weft retained by the presser 11a, can be smoothed out when the latter is in operation.

In contrast to the two embodiments shown in FIGS. 1 to 5, in the embodiment shown in FIGS. 6 through 9 the second retaining device is arranged substantially under the shed while the presser 11b has the form of a cranked reed. Presser 11b is arranged on the upper end of a vertically axially moving rod 34b which is prevented from rotating by means of pin 35b and guided in a guide housing 36b. The presser 11b is urged into its operating or weft retaining position by means of a compression spring 37b which is arranged between the guide housing 36b and a collar 38b of the rob 34b.

collar 38b of the rod 34b. Guide housing 36b is secured on a portion 9b of the slay by means of two bolts 39b and contains a bearing for a shaft 40b. A locking lever 41b is fixedly mounted on the shaft 40b adjacent rod 34b and is normally retained in a recess 42b of rod 34b. When the locking lever 41b engages recess 42b, the reed-shaped presser 11b is in an inoperative or weft retaining position and extends simultaneously through the warps of the upper and lower shed while being located above the gripping shuttle 1b. Adjusting lever 17b mounts a roll 43b on the shaft 40b opposite the rod 34b for cooperative movement with the adjusting member 18b of the gripping shuttle 1b. In this embodiment the adjusting member 18b is formed as a cam means. The locking lever 41b is moved into its inoperative or rod releasing position of FIG 7 when the member 18b engages the lower portion of the roll 43b of the adjusting lever 17b, whereby compression spring 37b moves the reed-shaped presser 11b into its operative weft retaining position as shown in FIG. 7. The abutment of presser 11b is in this case not the shuttle track of the slay, but a plate 45b made of elastic material and rigidly connected with the guide housing 36b by a support 44b. The return movement of the reed-shaped presser 11b into the inoperative position is effected by means of cam disc 20b, operating in conjunction with a double lever 46b. Cam disc 20b has two cams 47b and 48b. Cam 47b has the function of moving the reed shaped presser 11b into an inoperative position shown in FIG. 6 and imparts to the rod 34b an ascending movement so that rod 34b together with recess 42b is moved slightly beyond the upper part of the locking lever 41b. Second cam 48b, on the other hand, serves to release the beginning of the retained weft so that it can be beaten up. Second cam 48b thus becomes effective after the second retaining device has been released and imparts a less extensive but longer stroke to the rod 34b than does cam 47b. The upward movement of the rod 34b by means of the cam 48b begins with the movement of the slay, that is, when the warps move into the closed shed. Reed shaped presser 11b remains in its upper position by means of the cam 48b until the slay comes to a stop and the weft is beaten up. It is necessary to maintain the upper position of the reed-shaped presser 11b, in order to avoid looping of the weft when the slay is changed and to prevent the weft from breaking or from being drawn in when the slay moves. It is to be understood that one second retaining device each is provided on each side of the shed or loom, one being effective when the shuttle moves out of the shed on one side, the other when the shuttle leaves the shed on the other side. To this end the gripping shuttle has two cams 18b on opposite sides of the catches 2b and 3b. During the movement of the shuttle to the right the cam on the left side of the shuttle approaches roller 43b, but it passes underneath roller 43b since the latter is held in raised position following passage of the preceding cam due to the fact that locking lever 41b engages rod 34b as shown in FIG. 7.

Figure 9:
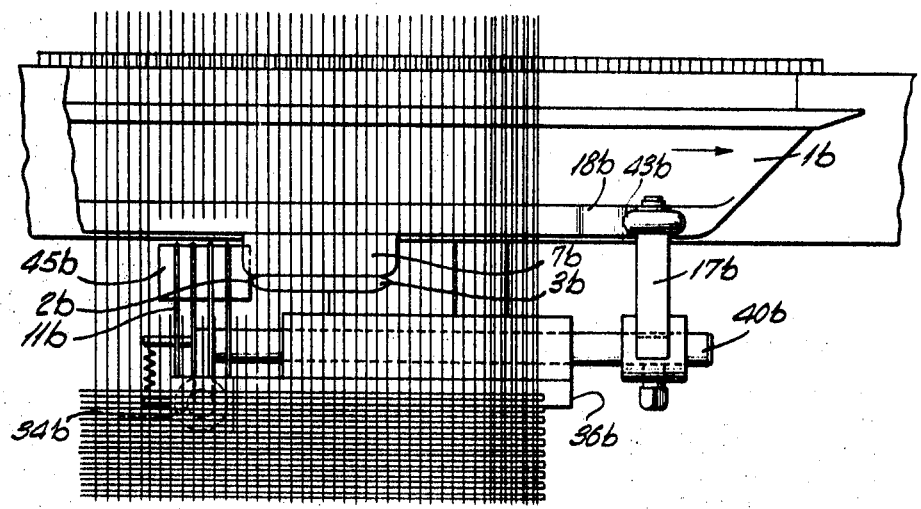
Figure 10:
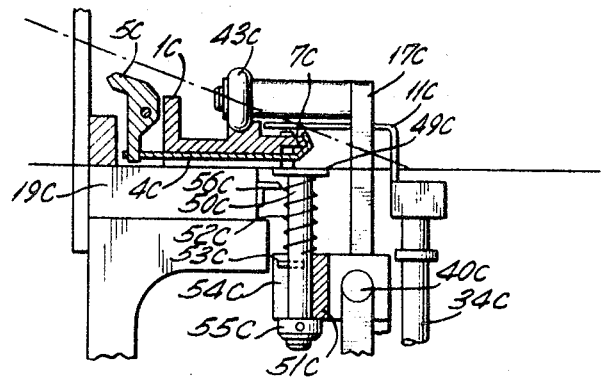
FIGS. 10 to 12 show an embodiment of this invention in which a second retaining device is arranged outside the respective longitudinal edge of the fabric.
Figure 11:
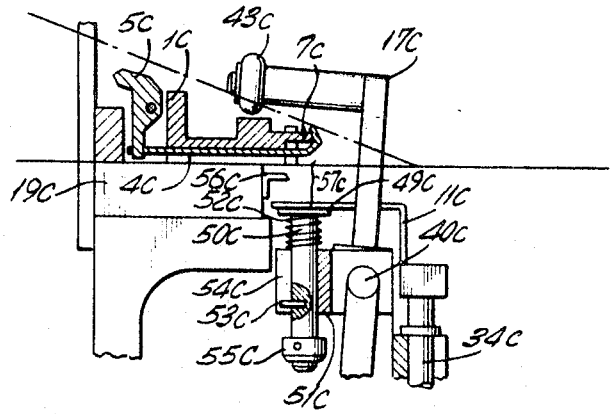
Figure 12:
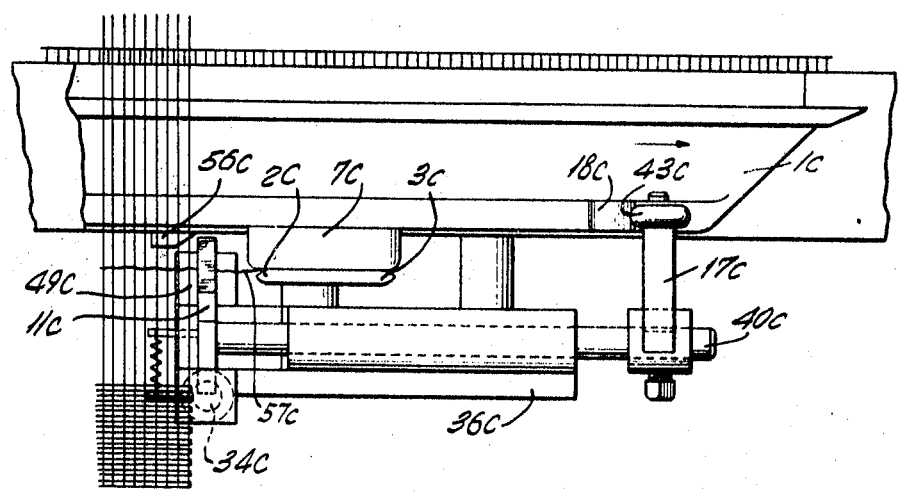

The second retaining device of FIGS. 10 to 12 corresponds substantially to that shown in FIGS. 6 through 9, with the difference that the presser 11c is not a reed but a bent-off tongue, and is arranged laterally outside the respective longitudinal edge of the fabric as shown in FIG. 12. The abutment surface cooperating with the presser 11c, consist of a vertically movable support 49c secured to the upper end of a vertical bolt 50c which is guided axially in a rear projection 51c of the guide housing 36c. Compression spring 52c maintains the support 49c in an inoperative position as shown in FIG. 10. The support 49c is prevented from rotating by means of a pin 53c arranged on the bolt 50c and is engageable with a slot 54c of the projection 51c, whereby ascending movement of the support 49c is limited by adjusting ring 55c. The released presser 11c moves support 49c into the low position as shown in FIG. 11, whereby the retained weft head also moves down. Between the two end positions of support 49c, a knife 56c is secured on the front face of the shuttle track 19c. During the ascending movement of the support 49c the weft head forms, between the respective longitudinal fabric edge and the presser 11c, a vertical thread section 57c which crosses the knife 56c. After engagement of the weft, the knife 56c is moved forward by the slay moving into the engaging position beyond the tip of the slay so that the knife 56c cuts off the thread section 57c adjacent the fabric.

The second retaining device embodiment shown in FIGS. 13 through 16, is positioned above the shed, and just outside the warp edge of the fabric being woven, but is not pivotally connected with the reed. The presser 11d is in the form of a reed, such as that shown in FIGS. 6 through 9, and is mounted on a lever 58d which is pivoted about a pin 59d extending parallel to the weft direction. The reed-shaped presser 11d is held in operating or weft retaining position by a torsion spring 60d so designed that it normally urges presser 11d into engagement with the shuttle track 19d and transversely to the direction of movement of the shuttle 1d. (See FIGS. 15 and 16.) Pin 59d is positioned on slide 61d which moves back and forth perpendicularly to the reed in the direction of the double arrow shown in FIG. 13. Slide 61d receives its driving force from a cam disc similar to disc 20i in FIG. 27. For positioning the lever 58d which carries presser 11d, a roll 62d is fixedly mounted on the machine frame. Roll 62d cooperates with the bottom edge of lever 58d which is formed like a cam. During the forward movement of slide 61d lever 58d moves into an operating position shown in FIG. 14 despite the presence of roll 62d, and is moved into the inoperative or weft releasing position shown in FIG. 13 by roll 62d during the return movement of slide 61d. In order to retain the lever 58d in the inoperative position, a latch 63d is provided which is mounted pivotally on a journal 64d. Journal 64d carries a torsion spring 65d which holds latch 63d in the operating position. In this position latch 63d engages the bottom edge of lever 58d. (See FIG. 13.) The adjusting lever 17d, which cooperates with the adjusting member 18d of the gripping shuttle 1d, is connected for movement with the latch 63d. (See FIG. 15.) When adjusting member 18d engages the adjusting lever 17d, latch 63d is moved into the position shown in FIG. 15 and lever 58d, along with the reed-shaped presser 11d, is subject to the influence of the torsion spring 60d. Lever 58d is moved out of contact with the roll 62d by moving slide 61d in the direction toward the reed. Prior to the weft being beaten up or bound into the shed by the reed, slide 61d is moved back by a cam similar to cam 48b on cam disk 20 to thereby move the presser 11d out of the path of movement of the reed temporarily. Before the gripping shuttle 1d is actuated again slide 61d moves back whereby the roll 62d moves lever 58d of presser 11d upwardly. The upper edge of lever 58d engages a cam 66d disposed on the lower portion of the hook of latch 63d whereby the latch 63d is moved clockwise and locks with the lever 58d. It should be noted that latch 63d has already been returned by means of a compression spring 65d which acts immediately after the adjusting member 18d of the gripping shuttle 1d has passed the adjusting lever 17d.

The adjusting lever 17d is thereby moved into its operating position. To insure that the adjusting lever 17d is moved from the path of the gripping shuttle before the gripping shuttle is actuated, a second cam 67d (see FIG. 15) is provided above the hook of latch 63d. Thereafter, lever 58d is moved upwardly by means of roll 62d, whereby the adjusting lever 17d is temporarily moved into a position to permit the passage of gripping shuttle 1d. A stop pin 68d (see FIG. 15) is mounted on the latch 63d to determine the operating position of the latch 63d and adjusting lever 17d while the slide 61d acts as an abutment for stop pin 68d. This arrangement insures a cooperation between the lever 58d and the cam 66d when lever 58d is moved upwardly by the roll 62d. In the embodiment shown in FIGS. 13 to 16 the presser 11d cooperates with shuttle track 19d as an abutment in the same manner as shown in FIGS. 1 to 5.

Figure 17:
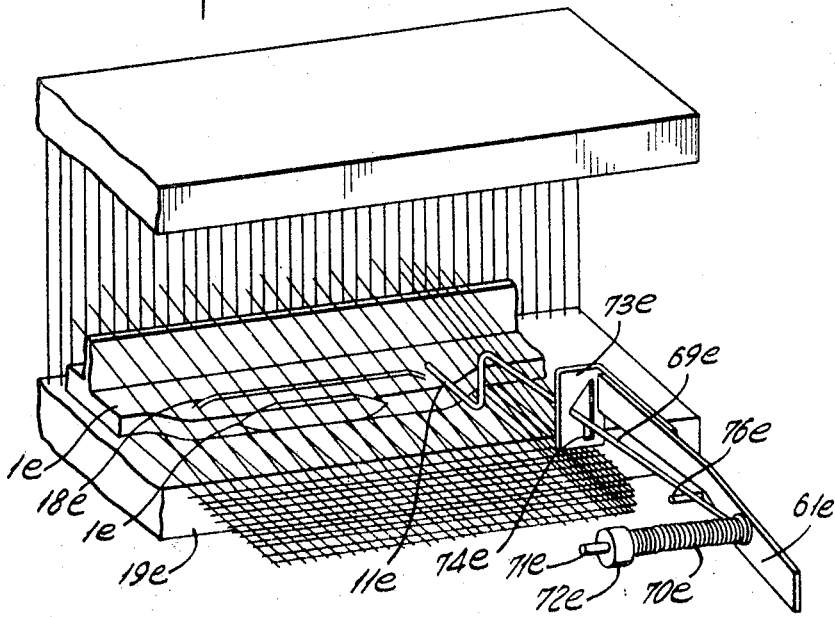
FIGS. 17 and 18 show another embodiment of this invention in which the second retaining device is similar to the one shown in FIGS. 13 to 16.
Figure 18:
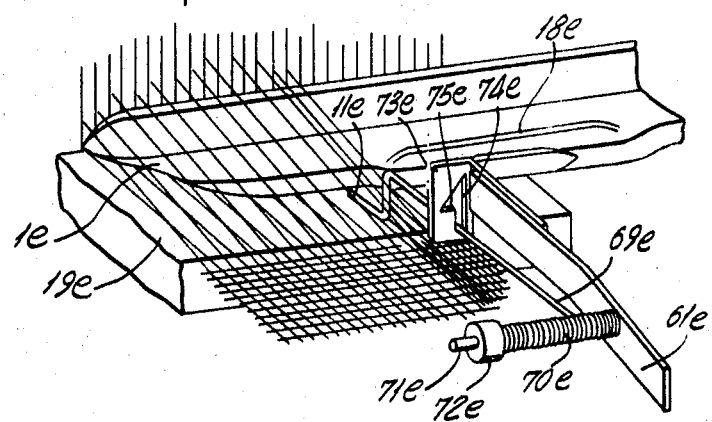

The embodiment shown in FIGS. 17 and 18 corresponds substantially to that shown in FIGS. 13 through 16. Presser 11e, however, is formed by the free end of a spring rod 69e with an initial stress directed both toward the center of the fabric and downward. At the far end of presser 11e, the spring rod 61e is wound to a torsion spring 70e, and is mounted on a bolt 71e of the slide 61e. The free end of the torsion spring 70e is connected to an adjusting spring 72c whereby the presser 11e is held in the lowered operating or weft retaining position as shown in FIG. 18. For the initial stress of spring rod 69e towards the fabric center, the spring rod is bent to the inside at the head of torsion spring 70e. The spring rod 69e engages a guide 73e provided on the right hand side of the slide 61e. A vertical slot 74e and a horizontal locking edge 75e, arranged above and inside slot 74e, are provided in guide 73e (FIG. 17). A supporting member 76e is disposed below spring rod 69e (see FIG. 17). In the inoperative or weft releasing position spring rod 69e presses upon supporting member 76e whereby the presser 11e is in its upper position. The adjusting member 18e is mounted on the upper portion of the gripping shuttle 1e. Before the arrival of gripping shuttle 1e, slide 61e is moved in the direction towards the reed. Spring rod 69e is thus released from the support member 76e and is urged on the locking edge 75e (see FIG. 18). When adjusting member 18e of the gripping shuttle 1e engages the presser 11e, the spring rod 69e is bent outwardly and moves in the range of slot 74e. As soon as adjusting member 18e of gripping shuttle 1e moves under presser 11e, spring rod 69e moves downwardly into slot 74e and assumes the operating position shown in FIG. 18. To return spring rod 69e to the inoperative position, slide 61e is pulled back whereby the supporting member 76e releases the spring rod 69e which in turn moves back into locking edge 75e.

Figure 19:
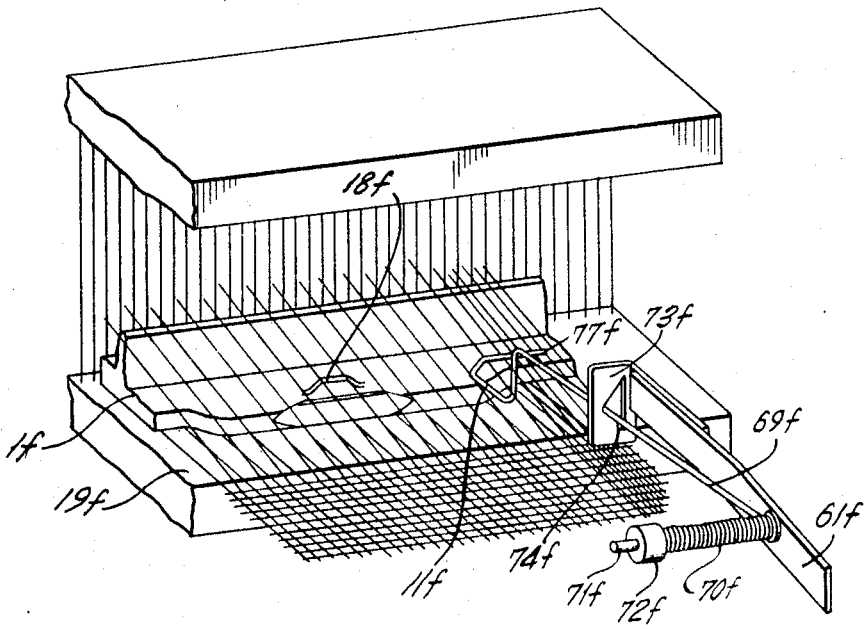
FIGS. 19 and 20 show a further modification of this invention similar to that shown in FIGS. 17 and 18.
Figure 20:
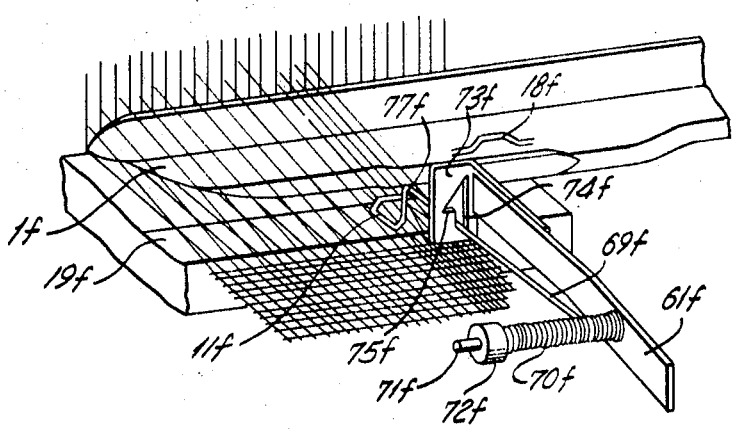

The retention of the beginning of the weft is achieved in this embodiment by the free end of spring rod 69e. As shown in FIGS. 19 and 20, this can also be additionally effected by an extension 77f which adjoins the part of the spring rod 69f forming the presser 11f and extends in the weft direction. The extension 77f, is arranged above the upper shed and presses the beginning of the weft over the warps of the shed together with presser 11f against the abutment surface of shuttle track 19f.

Figure 21:
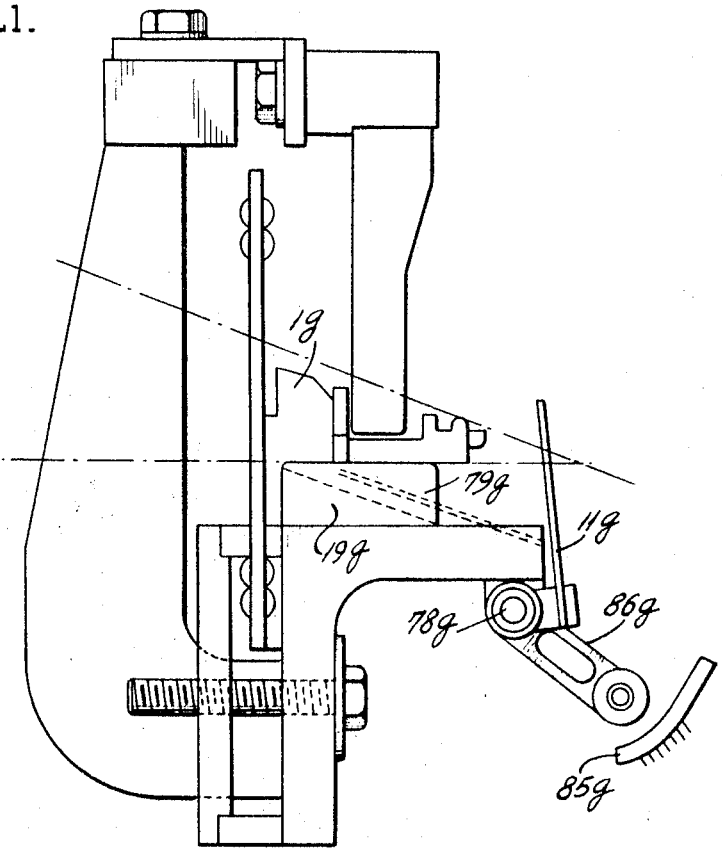
FIGS. 21 and 22 show another embodiment of this invention in which the second retaining device is provided on the slay having a presser consisting of a reed with which the weft thread can be pressed against the shed tip, the presser being below the shed.
Figure 22:
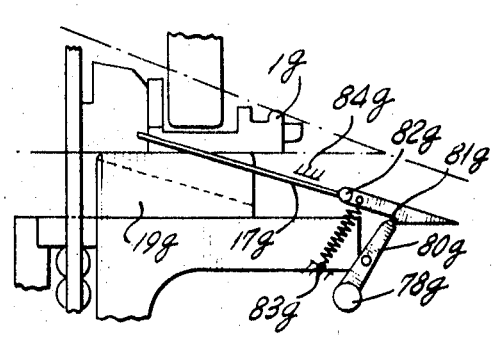

In the embodiment shown in FIGS. 21 and 22, the second retaining device is operatively connected with the reed and the presser 11g consists of a reed which is arranged under the shed. This reed is secured on a shaft 78g mounted on the slay and is received in the inoperative or weft releasing position by a recess 79g disposed on the upper side of the shuttle track 19g. In FIG. 21 the inoperative position of the presser 11g is shown in broken lines while the operative or weft retaining position is shown in solid lines. Shaft 78g extends in the weft direction and is biased in the clockwise direction by means of a torsion spring (not shown) whereby the presser is held in the operating position by means of the torsion spring. A locking lever 80g is secured to shaft 78g and cooperates with a pivotal latch 81g (FIG. 22). Pivotal latch 81g is mounted on a shaft 82g which extends parallel to shaft 78g. Adjusting lever 17g is mounted on shaft 82g and cooperates with the gripping shuttle 1g. A tension spring 83g holds adjusting lever 17g against a stop 84g (see FIG. 22). In this position, the free end of adjusting lever 17g engages the track of gripping shuttle 1g (as seen in FIG. 22). The adjusting lever 17g is urged downward by the arrival of gripping shuttle 1g causing the pivotal latch 81g, to move out of contact, whereby the locking lever 80g is released and the torsion spring associated with shaft 78g thereby moves the presser 11g into the operating position. The presser 11g consisting of a reed, moves through the warps of the shed to the beginning of the weft and presses the beginning of the weft into the tip of the shed. The return of presser 11g to the inoperative position is achieved by the slay moving into the engaging position. On the arrival of the gripping shuttle 1g, the shaft is arranged behind the shed tip but is brought in front of the shed tip when the slay moves into the engaging position. Presser 11g thus remains under the influence of the torsion spring associated with shaft 78g but is pivoted back to the locking lever 80g about the pivotal latch 81g by the resistance of the shed tip. However, it is also possible to enhance the return movement of presser 11g by a stationary cam 85g (see FIG. 21) which cooperates with a roll lever 86g of shaft 78g.

Figure 23:
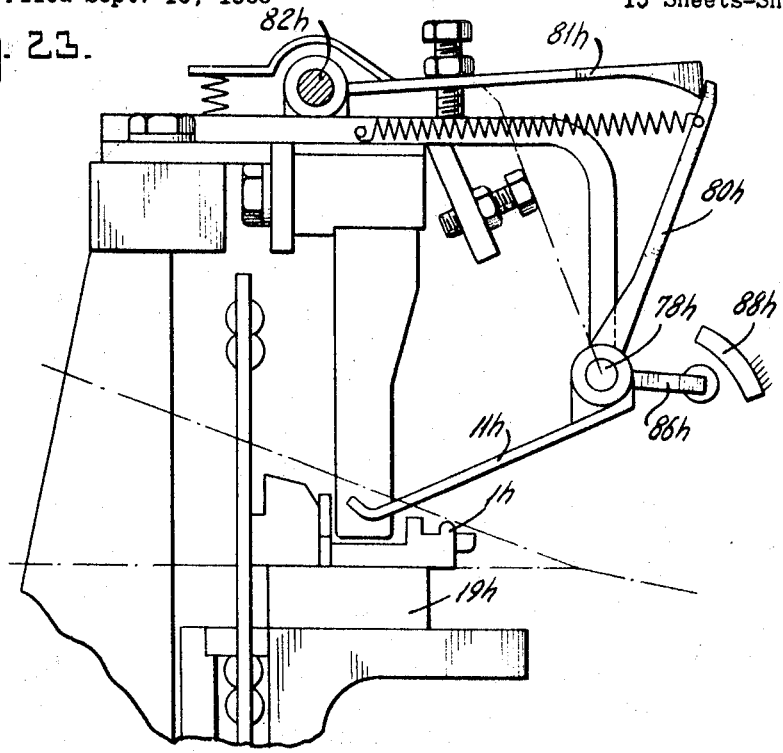
FIGS. 23 and 24 show an embodiment of this invention similar to that shown in FIG. 21 with a presser provided above the shed.
Figure 24:
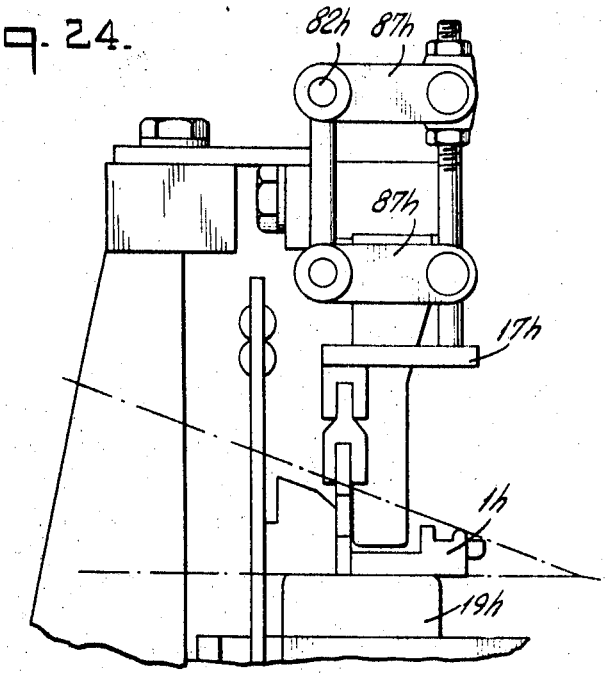

The embodiments shown in FIGS. 23 and 24 correspond substantially to that shown in FIGS. 21 and 22 with the modification that the reed-shaped presser is arranged above the shed and thus protrudes from the top between the warps to the beginning of the weft which the presser finally passes into the shed tip. Presser 11h is arranged together with locking lever 80h on the shaft 78h (FIG. 23) and the pivotal lever 81h is mounted on shaft 82h (FIG. 23).

The adjusting lever 17h which cooperates with gripping shuttle 1h is mounted for an up and down movement by means of two arms 87h, whereby the upper arm 87h is rigidly secured to the shaft 82h. (See FIG. 24.) The return of the presser 11h is effected, at least substantially, by the forward movement of the slay but can be enhanced by a roller lever 86h mounted on shaft 78h and cooperating with a stationary stop 88h.

In the embodiment shown in FIGS. 25 through 27 the second retaining device is arranged above the support whereby each element of the retaining device is mounted to the slay cover plate 9i by means of a holder 89i. The retention of the beginning of the weft, until the weft is being bound into the shed, is not effected by a presser, but by a clamp. This clamp consists of a jaw 90i rigidly connected with holder 89i and a movable jaw 91i. The movable jaw 91i is arranged on a journal 92i and slides back and forth at a right angle to the reed in a housing 93i which is connected with holder 89i. The movable jaw 91i is held in operating or weft retaining position by means of a compression spring 94i. Jaw 91i is held in the inoperative or weft releasing position by means of a sliding latch 95i which is provided with a recess 96i (see FIG. 26), cooperatively connected with a pin 97i which is in turn fixedly mounted on journal 92i. Sliding latch 95i is movable back and forth in the weft direction and is held in the operating position by means of a tension spring 98i (see FIGS. 25 and 26). Adjusting lever 17i arranged in housing 93i, consists of a double lever. The upward pointing arm of the double lever is held on the sliding latch 95i by means of leaf spring 99i (FIG. 25), while the downward pointing arm carries a roll 100i which cooperates with adjusting member 18i (FIG. 25) of gripping shuttle 1i. When the adjusting member 18i is below roll 100i sliding latch 95i releases pin 97i whereby the movable jaw 91i is placed into a locking position. A bearing block 101i for a double lever is mounted on the upper portion of the cover plate 9i, whereby one arm 102i of the double lever cooperates with the pin 97i of the journal 92i during the opening movement of the clamp. A second arm 103i of the double lever is actuated by the cam disc 20i about a toggle mechanism 104i and a cable 105i. When the clamp is moved into its weft releasing position shortly before the weft is beaten up by the reed so as not to interfere with the latter.

FIG. 28 illustrates an embodiment in which the second retaining device is released by electromagnetic means. Presser 11i consists of a V-shaped reed which is disposed at the rear of a rod 106i which extends at a right angle to the weft direction. Rod 106i moves back and forth within a guide 107i pivotally mounted about an axis 108i which is parallel to the weft direction. A compression spring 109i holds the rod 106i in the operating or weft retaining position, while a tension spring 110i maintains guide 107i in the operating position in which presser 11i retains the weft. A finger 111i is mounted on rod 106i and cooperates with a stop 112i. A finger 113i extends laterally from guide 107i, which cooperates with a latch lever 114i. An electromagnet 115i actuates the initial pivotal movement of the latch lever 114i. A contact device consisting of blades 116i and 117i is connected to and extends downward from slay cover plate 9i. When the gripping shuttle 1i contacts blades 116i and 117i, an electromagnet 115i is energized. Upon being energized, electromagnet 115i moves the latch bolt 114i thereby leaving guide 107i under the influence of tension spring 110i whereby the guide 107i is moved downwardly with its rear end so that the finger 111i disengages from stop 112i. The compression spring 109i is thereby released and the presser 11i moves downwardly causing the presser 11i to engage the beginning of the weft and press it against the tip of the shed. In order to move the presser 11i into the inoperative position, a cam disc 20i (as shown in FIGS. 9 and 27) is used to return both rod 106i and the guide 107i to the inoperative or weft releasing positions. The reed does not interfere with presser 11i during the beating up of the weft due to its fork-like construction.

Figure 29:
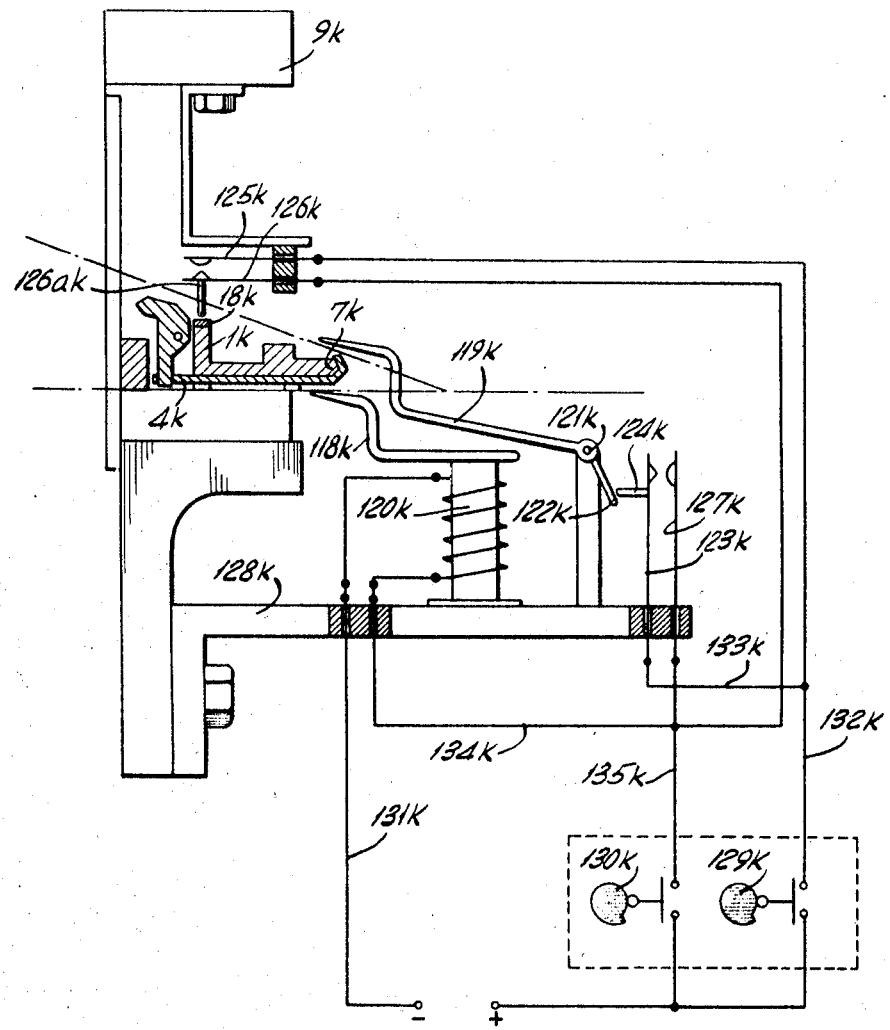
FIG. 29 shows a similar electromagnetically released second retaining device with a clamp.

FIG. 29 also shows an electromagnetically released second retaining device which is operatively connected with the slay. Here again the retaining means consists of two jaws 118k and 119k, both jaws consisting of a magnetizable material. Jaw 118k is rigidly connected with the core of an electromagnet 120k while the other jaw 119k is pivotally mounted about a bearing 121k. The movable jaw 119k has a finger 122k, extending therefrom and is in an open position by means of a leaf spring 123k in cooperation with a projection 124k. Mounted on the slay cover plate 9k are two contact means consisting of spring leaves 125k and 126k. The lower spring leaf 126k has a pin 126ak which cooperates with adjusting member 18k of the gripping shuttle 1k. A holding contact consisting of two spring leaves 123k and 127k is associated with an electromagnet 120k. Spring leaf 123k acts on finger 122k of the movable jaw 119k. Electromagnet 120k, bearing 121k of the jaw 119k, and the holding contact are all mounted on a support 128k which is secured on the slay. Two cam switches 129k and 130k are also provided. The negative pole of the current source (not shown) is applied directly to the electromagnet 120k by means of a conduit 131k. The positive pole of the current source is connected with the spring tongue 125k through a conduit 132k and through the cam switch 129k, while a branch conduit 133k connects the spring leaf 123k. A conduit 134k leads from the spring leaf 126k to the electromagnet 120k, whereby the conduit 134k is connected to a conduit 135k which connects the position pole current source through the cam switch 130k with the spring leaf 127k. When the gripping shuttle 1k arrives cam switch 129k is closed. When gripping shuttle 1k closes the spring leaves 125k and 126k, the positive current is connected through the conduits 134k to electromagnet 120k thereby energizing the electromagnet. The magnetized jaw 118k pulls the jaw 119k whereby the beginning of the weft is retained. When gripping shuttle 1k breaks the contact consisting of spring leaves 125k and 126k, the electromagnet 120k would ordinarily be de-energized. This is prevented by a holding contact in which spring leaf 123k is brought into contact with spring 127k by means of finger 122k of jaw 119k. The electromagnet 120k thereby remains energized over conduits 132k, 133k and 134k until cam switch 129k disconnects the conduit 132k.

Before the weft is beaten up or bound into the shed, the clamp must again be opened which is effected by opening cam switch 129k. Jaw 119k returns to its starting position under the action of spring leaf 123k which traverses the warps of the shed from the bottom. Ordinarily spring leaf 123k would engage the tip of the shed when the slay advances. This, however, is prevented by cam switch 130k which closes at this point. The positive current source is conducted through the conduits 134k and 135k to energize electromagnet 120k causing the attraction of jaw 119k.

Figure 30:
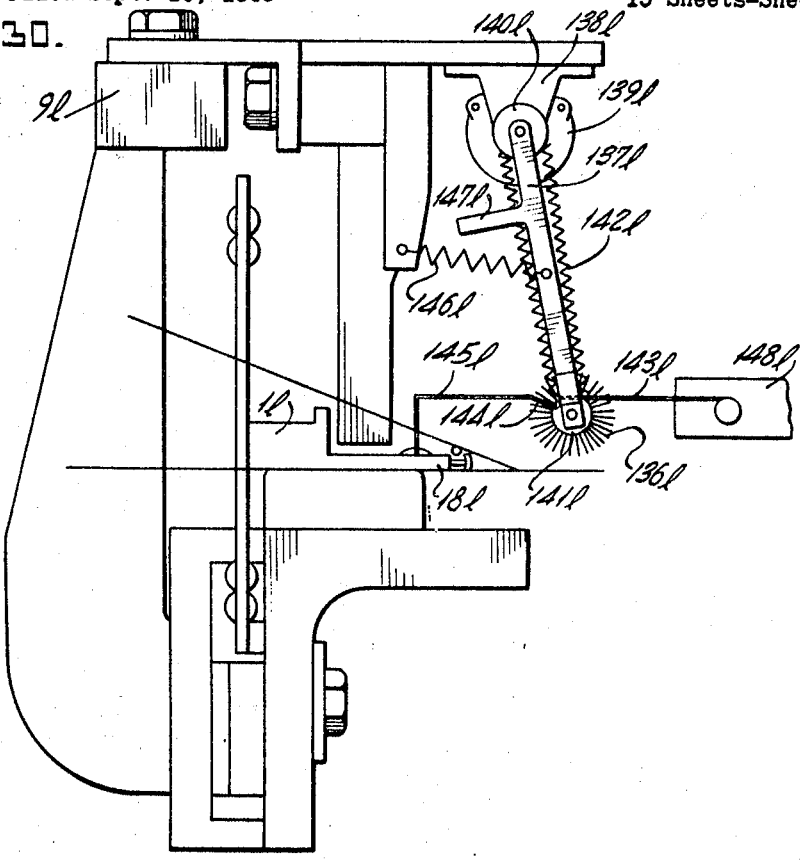
FIGS. 30 and 31 show a rotary brush as a retaining means for the beginning of the weft.
Figure 31:
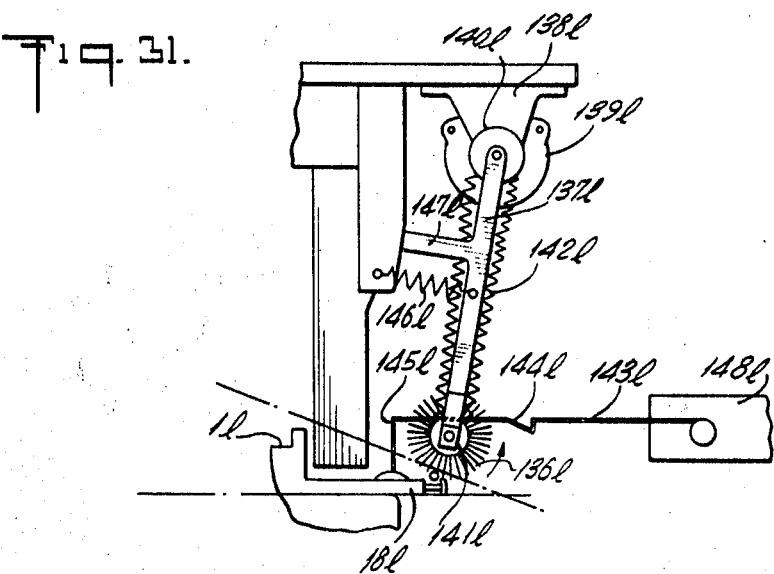

The embodiment shown in FIGS. 30 and 31 shows, as a retaining means for the second retaining device, a rotary brush 136L. The brush 136L is arranged at the lower end of a frame 137L which is pivotally mounted perpendicularly to the weft direction on a block 138L. The block 138L is connected with the cover plate 9L of the slay and has mounted thereon a motor 139L which drives the brush. The transmission from the motor to the brush is effected by rollers 140L and 141L along with an endless coil spring 142L. In the inoperative or weft releasing position brush 136L assumes the position shown in FIG. 30 in which it is held by means of a U-shaped spring clamp 143L. The spring clamp 143L is provided at its end with a projection 144L and engages an extension 145L which cooperates with the adjusting member 18L of the gripping shuttle 1L. The gripping shuttle 1L consequently moves the extension 145L upwardly and thus also the projection 144L, of spring clamp 143L so that frame 137L along with brush 136L moves under the influence of a tension spring 146L into the operating position or weft retaining position shown in FIG. 31, whereby a stop 147L limits the upward movement. In the operating position brush 136L is located directly behind the tip of the shed and traverses the warp at least at the upper shed. The brush 136L engages the beginning of the weft by a corresponding rotational movement and drives it toward the tip of the shed to press it finally against the shed tip. The spring clamp 143L is mounted on a slide 148L so that extension 145L can be placed in the vicinity of the adjusting member 18L of the gripping shuttle 1L only at the proper moment. Furthermore, slide 148L engages by a rearward movement, frame 137L of the brush in the operating position of the latter with spring clamp 143L, so that the brush 136L can be moved into the inoperative position by the subsequent advance movement of the slide 148L.

It is to be understood that the embodiments herein are shown merely for illustrative purposes and that the invention is not to be limited to these embodiments alone, but rather by the claims below.

What is claimed is:

1. In a loom having shed forming means, slay means, a driven member and a shuttle track: a gripping shuttle movable along said shuttle track for inserting a weft into a shed, a first weft retaining device mounted on said shuttle, a second weft retaining device connected to said slay means, means connected to said gripping shuttle for moving said second weft retaining device into a weft retaining position, and means operatively connected to said driven member for moving said second weft retaining device into a weft releasing position, said second retaining device including a presser, a rod supporting said presser and movable in longitudinal direction of said rod, spring means urging said presser into engagement with said slay means to retain a weft therebetween, locking means normally holding said presser out of engagement with said slay means, said means connected to said gripping shuttle including a member for releasing said locking means to thereby permit said spring means to bring said presser into weft retaining engagement with said slay means, said second weft retaining device being located laterally outside of a fabric being woven in said loom, and including a table adapted to be lowered by said presser.

2. A loom according to claim 1, which includes a knife for severing a weft held between said table and said presser.

3. The arrangement according to claim 1, which includes locking means releasable by said gripping shuttle for locking said presser in an inoperative position.

4. The arrangement according to claim 1, which includes slay means, and severing means arranged adjacent said table below said upper position for severing said weft during its downward movement, said severing means and said clamping means being tiltably connected to said slay means.

5. In a loom having a shed forming area, slay means, a driven member and a shuttle track: a gripping shuttle movable along said shuttle track for inserting a weft into a shed, a first weft retaining device mounted on said shuttle, a second weft retaining device connected to said slay means, means connected to said gripping shuttle for moving said second weft retaining device into a weft retaining position, and means operatively connected to said driven member for moving said second weft retaining device into a weft releasing position, said second retaining device including a presser, a rod supporting said presser and movable in longitudinal direction of said rod, spring means urging said presser into engagement with said slay means to retain a weft therebetween, locking means normally holding said presser out of engagement with said slay means, said means connected to said gripping shuttle including a member for releasing said locking means to thereby permit said spring means to bring said presser into weft retaining engagement with said slay means, said rod being arranged vertically under the shed forming area and said presser being fixedly mounted on the top portion of said rod, a shaft mounted below the shed forming area and rotatably supporting said locking means, said locking means including an adjusting lever mounted on said shaft and cooperating with said member on said gripping shuttle.

6. A loom according to cliam 5, which includes means for temporarily lifting said rod into an intermeriate position in which said presser is in a position intermedate said weft retaining and said weft releasing position.

7. A loom according to claim 6, which includes a cam disc connected to said driven member and having a first cam for lifting said rod into said intermediate position and a second cam for lifting said rod into a position in which said presser occupies said weft releasing position.

8. In a loom having shed forming means, slay means, a driven member and a shuttle track: a gripping shuttle movable along said shuttle track for enserting a weft into a shed, a first weft retaining device mounted on said shuttle, a second weft retaining device connected to said slay means, means connected to said gripping shuttle for moving said second weft retaining device into a weft retaining position, and means operatively connected to said driven member for moving said second weft retaining device into a weft releasing position, said second retaining device including a presser, a rod supporting said presser and movable in longitudinal direction of said rod, spring means urging said presser into engagement with said slay means to retain a weft therebetween, locking means normally holding said presser out of engagement with said slay means, said means connected to said gripping shuttle including a member for releasing said locking means to thereby permit said spring means to bring said presser into weft retaining engagement with said slay means, said slay means including a resiliently supported abutment surface for said presser.

9. In a loom having shed forming means, slay means, a driven member and a shuttle track: a gripping shuttle movable along said shuttle track for inserting a weft into a shed, a first weft retaining device mounted on said shuttle, a second weft retaining device connectd to said slay means, means connected to said gripping shuttle for moving said second weft retaining device into a weft retaining position, and means operatively connected to said driven member for moving said second weft retaining device into a weft releasing position, said second retaining device including a presser, means movably supporting said presser, spring means urging said presser into engagement with said slay means to retain a weft therebetween, locking means normally holding said presser out of engagement with said slay means, said means connected to said gripping shuttle including a member for releasing said locking means to thereby permit said spring means to bring said presser into weft retaining engagement with said slay means, said second weft retaining device being located laterally outside of a fabric being woven in said loom, and including a table adapted to be lowered by said presser.

References Cited

UNITED STATES PATENTS

| | | |
|---|---|---|
| 573,715 | 12/1896 | Simpson. |
| 2,819,736 | 1/1958 | Pfarrwaller _____ 139—194 |

FOREIGN PATENTS 94,432  10/1897  Germany.

HENRY S. JAUDON, Primary Examiner

U.S. Cl. X.R.

139—125, 194